(12) United States Patent
Koshiba et al.

(10) Patent No.: US 6,274,271 B1
(45) Date of Patent: Aug. 14, 2001

(54) NON-AQUEOUS ELECTROLYTE LITHIUM SECONDARY BATTERY

(75) Inventors: Nobuharu Koshiba, Ikoma-gun; Emi Asaka, Takatsuki; Koichi Chikayama, Hirakata; Yoko Sano, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/915,719

(22) Filed: Aug. 21, 1997

(30) Foreign Application Priority Data

Aug. 27, 1996 (JP) .................................... 8-224883

(51) Int. Cl.$^7$ .................................... H01M 4/48
(52) U.S. Cl. .................................... 429/231.1; 429/231.5; 429/232
(58) Field of Search .................... 429/231.1, 231.5, 429/232, 338

(56) References Cited

U.S. PATENT DOCUMENTS

| | | | |
|---|---|---|---|
| 5,028,500 | * 7/1991 | Fong et al. | 429/194 |
| 5,464,708 | * 11/1995 | Neat et al. | 429/218 |
| 5,545,468 | * 8/1996 | Koshiba et al. | 429/218 |
| 5,569,561 | * 10/1996 | Exnar et al. | 429/218 |
| 5,766,796 | * 6/1998 | Abraham et al. | 429/192 |
| 5,882,218 | * 3/1999 | Reimers | 429/224 |

FOREIGN PATENT DOCUMENTS

| | | |
|---|---|---|
| 0 617 474 | 9/1994 | (EP) . |
| 06275263 | 9/1994 | (JP) . |
| 7-302587 | 11/1995 | (JP) . |

OTHER PUBLICATIONS

Ferg et al., "Spinel Anodes for Lithium Ion Batteries" J. Electrochem. soc., vol. 141, No. 11, pp. 151–153, Nov. 1994.*

Colbow et al., "Structure and electrochemistry of the spinel oxides..." J. Power sources, vol. 26. No. 3–4, pp. 397–402. (No month available, 1989.*

* cited by examiner

Primary Examiner—Carol Chaney
(74) Attorney, Agent, or Firm—McDermott, Will & Emery

(57) ABSTRACT

A non-aqueous electrolyte lithium secondary battery comprising a negative electrode of spinel-type lithium-titanium oxide with improved overcharge and overdischarge characteristics is disclosed. In this battery, the rechargeable electric capacity of the negative electrode is adjusted to be smaller than that of the positive electrode. In a preferable mode, the negative electrode may further comprise a material which has more negative potential than that of the lithium-titanium oxide, and shows electrochemical reversibility. An electrolyte comprising ethylene carbonate and $LiN(CF_3SO_2)_2$ or $LiN(C_2F_5SO_2)_2$ is preferable.

5 Claims, 1 Drawing Sheet

NON-AQUEOUS ELECTROLYTE LITHIUM SECONDARY BATTERY

BACKGROUND OF THE INVENTION

The present invention relates to an improvement in performance of a non-aqueous electrolyte lithium secondary battery comprising a negative electrode of a lithium-titanium oxide.

With the recent rapid development of technology in the field of electronics, electronic appliances have been miniaturized remarkably, and the demands for batteries of smaller size and lighter weight with a high energy density are increasing accordingly. As such batteries, lithium secondary batteries configured with a lithium negative electrode are attracting attention in this field of art, and researches and developments of these batteries are now briskly conducted in global scale. However, if metallic lithium is utilized in the negative electrode, the lithium may sometimes be pulverized and arborescent crystals called lithium dendrites may sometimes be formed on the lithium negative electrode with repetition of charge and discharge. In such cases, the shape of the lithium negative electrode may be damaged and a satisfactory charge/discharge cycle life cannot be obtained, and in an extreme case, the lithium dendrites pierce through a separator and cause an inner short-circuiting of the battery.

As a means for solving the above-mentioned inconvenience, an investigation is now conducted for a negative electrode which comprises a lithium-aluminum alloy, a lead-containing alloy capable of intercalating and deintercalating lithium, various carbon materials, an oxide of transition metal such as niobium pentoxide, an anatase-type titanium oxide, tungsten dioxide, or a ferrous or ferric oxide, each doped with lithium. For preventing against the lithium dendrite formation, carbon or an oxide of transition metal is excellent in particular, and it has been found that the charge/discharge cycle life of the battery can greatly be improved by employing these materials in the negative electrode.

Recently, lithium secondary batteries are used in various appliances as a direct-current power source for a mobile unit, a power source for memory back-up and the like. In order to fully satisfy the required performances, it is extremely important to fulfill not only sufficient energy density or charge/discharge cycle life characteristic, but also high reliability of the battery, in particular, withstanding overcharge and overdischarge characteristics of the battery. However, a combination of the above-specified negative electrode and a conventional positive electrode may not necessarily give a battery that has the withstanding overcharge and overdischarge characteristics.

BRIEF SUMMARY OF THE INVENTION

As a result of experiments of various metal compounds for configuring the negative electrode, the present inventors have found that a lithium-titanium oxide of spinel-type structure which is disclosed in Japanese Laid-Open Patent Hei 6-275263 shows excellent charge/discharge performance, and that a negative electrode comprising this material is excellent in stability in a wide potential range which cannot be obtained with any other negative electrode materials.

The primary object of the present invention is to provide a non-aqueous electrolyte secondary battery which has improved withstanding overcharge and overdischarge characteristics as the battery system, which was realized by focusing on these characteristics of the lithium-titanium oxide of a spinel-type structure.

The present invention provides a non-aqueous electrolyte lithium secondary battery comprising
- a negative electrode which comprises at least one spinel-type lithium-titanium oxide,
- a positive electrode which has a higher potential than that of the spinel-type lithium-titanium oxide, and
- a non-aqueous electrolyte,
- wherein rechargeable electric capacity of the negative electrode is smaller than that of the positive electrode.

In the conventional lithium secondary battery which utilizes metal oxides as positive and negative electrodes, it is very difficult to satisfy both withstanding overcharge and overdischarge characteristics at the same time, even if the electric capacity of the positive electrode is kept balanced to that of the negative electrode by some means. The reason for this is that although there exists a number of positive and negative electrodes which can function stably in a normal charge/discharge potential range, there are very scarce materials with a constant stable crystal structure in a very wide potential range over the overcharge and overdischarge potentials which greatly exceed the normal charge/discharge potential region.

The present inventors have now found that among a number of metal oxides, the lithium-titanium oxide having the spinel structure exists in the very stable state without being destroyed its crystal structure over a very wide potential range from 0 V to 4 V, despite the fact that a plateau potential during the charge/discharge processes is near 1.5 V with respect to metallic lithium (in the following description, "potential" is used by taking the potential of metallic lithium as reference).

Since intercalating and deintercalating reaction of lithium ions in and from the spinel-type lithium-titanium oxide crystal proceeds almost free from distortion of the crystal lattice of the oxide, it is believed that the spinel-type lithium-titanium oxide crystal not only demonstrates excellent charge/discharge performance but also very strong resistance against a potential stress.

The present invention is completed by focusing on this very stable characteristic of the spinel-type lithium-titanium oxide in a wide potential range. The electric capacity of the negative electrode is made smaller than the electric capacity of the positive electrode in the reversible region in order to best utilize such characteristic. By doing so, the potential of the positive electrode does not vary greatly even at the end of the discharging process and remains in the reversible region, and thus the crystal structure is maintained stable without being destroyed.

On the other hand, although the potential of the negative electrode is close to the potential of the positive electrode during the discharging process, the negative electrode is not essentially destroyed and exists stably even if the potential of the positive electrode remains as high as 3 V or 4 V, and thus the negative electrode can strongly withstand against the overdischarge.

And, even if the battery is stood still while holding the discharge circuit in a state close to a complete discharge for a long period of time, the performance of the electrode is not deteriorated.

In addition, in the charging process, since the electric capacity of the negative electrode is smaller than that of the positive electrode, the potential of the positive electrode does not vary greatly and the charging process is completed by lowering the potential of the negative electrode.

At that time, since the negative electrode can maintain its stable state until at least a potential of 0 V, the upper-limit within which the battery can be overcharged can be set higher by at least 0.15 V than the plateau voltage during the charging process, and the reliability for withstanding the overcharge is greatly improved.

In the description of the present invention, the term "electric capacity of the positive electrode or the negative electrode" means a reversible and chargeable or dischargeable capacity of the respective electrodes under standard conditions equivalent to an ambient temperature and charge/discharge current, as far as a battery configured with these positive electrode and negative electrode is utilized. Accordingly, the present invention establishes a relationship between the negative electrode with an electric capacity which is substantially equal to the chargeable and dischargeable electric capacity of the battery configured with this electrode, and the positive electrode with an electric capacity which is larger than the above-mentioned capacity. Since these electric capacities vary slightly depending on the employed measuring conditions, the values of the electric capacities of the positive and negative electrodes defined in the present invention are determined in accordance with the values measured under the following conditions.

A) The electric capacity of the positive electrode

The positive electrode and a counter electrode of, for instance a metallic lithium electrode to be used in configuring a relevant battery are immersed in an electrolyte of a composition identical to that used in the relevant battery, and then charged and discharged at room temperature (25±5° C.). First, the positive electrode is charged at a current density of 0.1 mA/cm$^2$ until completion of deintercalation of lithium from the deintercalatable lithium and then discharged at a current density of 0.1 mA/cm$^2$ until the potential of the positive electrode drops to 2 V. The value of the discharge electric capacity of the positive electrode measured at that time is determined as the electric capacity of the positive electrode.

B) The electric capacity of the negative electrode

The negative electrode and a counter electrode of, for instance a metallic lithium electrode to be used in configuring a relevant battery are immersed in an electrolyte of a composition identical to that used in the relevant battery, and then charged and discharged at room temperature (25±5° C.). First, the negative electrode is charged at a current density of 0.1 mA/cm$^2$ until the completion of intercalation of lithium into the intercalatable lithium and then discharged at a current density of 0.1 mA/cm$^2$ until the potential of the negative electrode rises to 2 V. The value of the discharge electric capacity of the negative electrode measured at that time is determined as the electric capacity of the negative electrode.

While the novel features of the present invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
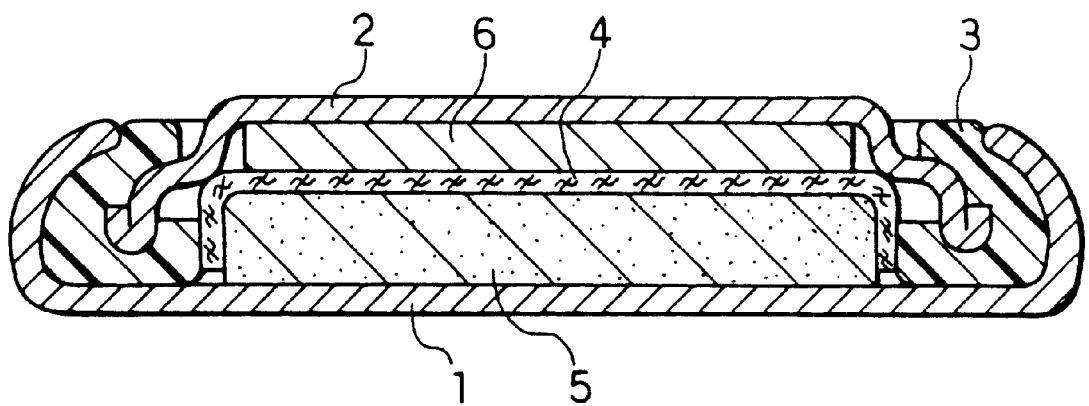
FIG. 1 is a longitudinal cross-sectional view of a non-aqueous electrolyte lithium secondary battery in accordance with an embodiment of the present invention.

The present invention can be embodied in various modes of embodiments which will be described later, by adopting the above-mentioned fundamental means for solving the problems and their functions and further developing them.

First, by adding a material which has more negative potential than that of the spinel-type lithium-titanium oxide and electrochemical reversibility, it is possible to enhance the withstanding overcharge characteristic of the oxide.

For instance, a carbon material such as graphite which is electrochemically reversible and capable of intercalating or deintercalating lithium may be added, in addition to other carbon material which is used as the conductive agent. In the case of adding the graphite, since the potential of the graphite to which the lithium is intercalated demonstrates a potential as low as approximately 0 V, even when overcharging of the battery is still continued, lithium is intercalated to the graphite at a charge voltage about 1.5 V higher than the charge voltage of the spinel-type lithium-titanium oxide, and the battery demonstrates a plateau charging voltage which corresponds to the increased electric capacity.

Therefore, the upper-limit charging voltage can previously be set below the plateau charging voltage. The potential of the negative electrode is maintained for a while even if it reaches the potential close to 0 V, which decreases the risk of fluctuations in the potential.

In addition, when the plateau potential close to 0 V is taken as a signal and a charging voltage above that is cut off, it is possible to prevent any damage attributable to the overcharging. Other than the disclosed graphite, a similar technical advantage is obtained by adding any other carbon material, $WO_2$, $Fe_2O_3$, $LiFe_5O_8$, $SiO_2$, $SnO$ or the like which also shows electrochemical reversibility and demonstrates a more negative potential than the spinel-type lithium-titanium oxide in a lithium intercalating state.

The electrolyte, on the other hand, plays an important role in fulfilling the requirement for the satisfactory withstanding overcharge or overdischarge characteristic. Since there is a possibility of lowering the potential of the negative electrode below 1.5 V and around 0 V in the overcharging process, the electrolyte on the negative electrode may sometimes be decomposed. In order to prevent the electrolyte from decomposing, it is preferable to use ethylene carbonate as an organic solvent for the electrolyte. The ethylene carbonate has a function of preventing the electrolyte from decomposing which might occur when the electrolyte reacts with the carbon at a potential around 1 V.

In addition, since the ethylene carbonate has a high dielectric constant, it is possible to further improve the reversibility of charge/discharge. The ethylene carbonate is however solid at room temperature, and thus it is preferable to mix it with a low-viscosity solvent, such as propylene carbonate, butylene carbonate, tetrahydrofuran, 1,2-dimethoxyethane, 1,2-diethoxyethane, diethyl carbonate, dimethyl carbonate or the like.

In addition, if an electrolyte is prepared by dissolving $LiN(CF_3SO_2)_2$ as a solute in this organic solvent which contains ethylene carbonate, the stability of the oxide for the charge/discharge at a temperature as high as 70 to 80° C. and against the overcharge are enhanced as a result of synergistic effect. The reason for this is that while $LiN(CF_3SO_2)_2$ demonstrates high electric conductivity comparable to $LiPF_6$, it is very stable at a potential of not more than 3.5 V even at high temperature, and, in addition, it has a preferable affinity for ethylene carbonate.

The disclosed $LiN(CF_3SO_2)_2$ is a little unstable at a potential of not less than 4 V, so that it is preferably used in a battery configured with a positive electrode which has a potential of less than 4 V. An analogous imide is LIN ($C_2F_5SO_2)_2$. Although the electric conductivity of this imide is slightly inferior to $LiN(CF_3SO_2)_2$, it demonstrates high stability at an ambient temperature as high as 70 to 80° C., and is also stable at a potential of about 4 V and thus it can be used in a wide potential range.

The spinel-type lithium-titanium oxide to be used in the negative electrode of the present invention is represented by the general formula $Li_{1+X}Ti_{2-X}O_4$ ($-0.2 \leq X \leq 1/3$), and can be typically exemplified as $Li_{0.8}Ti_{2.2}O_4$, $LiTi_2O_4$, $Li_{4/3}Ti_{5/3}O_4$ ($Li_{1.33}Ti_{1.66}O_4$) and the like. Any of them has preferable withstanding overcharge and overdischarge characteristics. In particular, $Li_{4/3}Ti_{5/3}O_4$, which is a defective-type titanium spinel, is the most excellent. Its technical advantage realized by the present invention is the greatest and thus it is believed to prove effective.

In the following paragraphs, specific examples of the present invention will be described in detail.

EXAMPLE 1

$Li_{4/3}Ti_{5/3}O_4$, carbon black for a conductive agent, and a fluorocarbon resin powder as a binder were mixed together in a weight ratio of 90:5:5, kneaded and molded to give pellets having a thickness of about 0.5 mm and a diameter of 18 mm. The obtained pellets were dried at 250° C. and dehydrated to obtain a negative electrode. The negative electrode has an electric capacity of about 40 mAh.

Separate from this, a lithium-containing manganese dioxide $Li_xMnO_y$ which was obtained by adding 0.3 mole of lithium hydroxide to 1 mole of manganese dioxide and subjecting the mixture to a heat treatment at 400° C., carbon black as a conductive agent, and a fluorocarbon resin powder as a binder were mixed together in a weight ratio of 90:5:5, kneaded, and then molded into pellets having a diameter of 12.0 mm. The obtained pellets were dried at 250° C. in a vacuum and dehydrated to obtain a positive electrode. The positive electrode had a charge/discharge potential of about 3 V with respect to that of metallic lithium. A thickness of the positive electrode was adjusted so that the ratio of the electric capacity of the negative electrode to that of the positive electrode is 0.8, 0.9, 1.0, 1.1 or 1.2. In this adjustment, the electric capacity of the positive electrode was taken as an electric capacity down to the discharge potential of 2 V and the electric capacity of the negative electrode was also taken as an electric capacity up to the discharge potential of 2 V. A terminal voltage of a battery configured with these positive and negative electrodes in the charged state was about 1.5 V, and the discharge capacity varied depending on the ratio of the electric capacities of the positive and negative electrodes but was in a range of about 32 to 40 mAh.

Coin-type lithium secondary batteries as shown in FIG. 1 were configured with these positive and negative electrodes. In FIG. 1, each of the coin-type lithium secondary batteries comprises a battery case 1 which also serves as a positive electrode terminal, a sealing disk 2 which also serves as a negative electrode terminal, a gasket 3 made of polypropylene for insulating the case 1 from the sealing disk 2, a separator 4 made of polypropylene nonwoven fabric, a positive electrode 5 and a negative electrode 6. Lithium ions have been electrochemically intercalated to the negative electrode 6 inside the battery by pressing the electrode with metallic lithium. The negative electrode 6 has an electric capacity of about 40 mAh. The positive and negative electrodes and the separator are impregnated with an electrolyte prepared by dissolving $LiPF_6$ in a equivolumetric mixed solvent of propylene carbonate, ethylene carbonate and 1,2-dimethoxyethane. Each of the batteries has an outer diameter of about 23 mm, and a height of about 3.0 mm. These batteries have symbols of A, B, C, D and E in the ascending order of the electric capacity ratios (0.8, 0.9, 1.0, 1.1 and 1.2 ) of the negative and positive electrodes.

EXAMPLE 2

$Li_{4/3}Ti_{5/3}O_4$, a natural graphite having a purity of not less than 99%, carbon black as a conductive agent, and a fluorocarbon resin powder as a binder were mixed together in a weight ratio of 75:15:5:5, kneaded and molded to give pellets having a diameter of 12.0 mm so that the electric capacity of $Li_{4/3}Ti_{5/3}O_4$ became 40 mAh. The obtained pellets were dried at 250° C. and dehydrated to obtain a negative electrode. The electric capacity attributable to the presently used natural graphite, which intercalates and deintercalates lithium in a reversible manner, is about 5 mAh. A positive electrode of the lithium-containing manganese dioxide $Li_xMnO_y$ similar to that of Example 1 was employed so that the ratio of the total electric capacity of the negative electrode comprising $Li_{4/3}Ti_{5/3}O_4$ and the natural graphite to the electric capacity of the positive electrode becomes 0.9:1. Except for the above, the battery has an identical configuration to that of Example 1. This battery has a symbol F.

EXAMPLE 3

In this example, the same solvent as that used in Example 1 and $LiN(CF_3SO_2)_2$, $LiClO_4$ and $LiBF_4$ were used as the solute for preparing the electrolytes. The same configuration as that of B in Example 1 was adopted and these electrolytes were used in configuring the batteries having symbols G, H and I.

In order to evaluate the performance of these batteries, the batteries of Example 1 were first discharged with a load resistor of 3 kΩ until the terminal voltages dropped to about 0 V, and then discharged continuously for 30 days while maintaining closed circuit state. Thereafter, they were charged at a constant voltage of 2.5 V and discharged with a load of 3 kΩ until the terminal voltages dropped to 1 V. The results of the electric capacities obtained are shown as capacity maintenance rate compared to the initial electric capacities in Table 1 below.

TABLE 1

| Battery | Capacity maintenance rate (%) after continuous discharge with 3kΩ for 30 days | Capacity maintenance rate after overcharge at 2.8 V at 60° C. for 30 days |
| --- | --- | --- |
| A | 99 | 99 |
| B | 99 | 98 |
| C | 98 | 93 |
| D | 85 | 83 |
| E | 75 | 68 |

As clearly shown in Table 1, the batteries D and E whose electric capacities of the negative electrodes are excessive suffer a deterioration in the discharge capacity. The deterioration of the battery E is particularly serious. The cause for such deterioration is that the performance of the positive electrode is deteriorated at the end of the discharge due to a great decrease in the positive electrode potential down to about 0 V. The battery C shows slight deterioration, because the influence of the decrease on the positive electrode potential is scarce at the ratio of 1:1 of the electric capacities of the negative and positive electrodes. The batteries A and B whose negative electrode capacities are small do not suffer any deterioration.

Subsequently, these batteries were applied with a voltage of 2.8 V at 60° C. for consecutive 30 days and discharged with a load resistor of 3 kΩ until the terminal voltages dropped to 1 V. The capacity maintenance rates based on the electric capacities obtained during the process compared to the initial electric capacities are also shown in Table 1.

As clearly shown in Table 1, although the batteries A and B whose negative electrode capacities are small suffer only scarce deterioration, a deterioration is recognized with the battery C whose electric capacities of the positive and negative electrodes are equal, and a remarkably large deterioration is observed with the batteries D and E. The cause for such deterioration is that the performance of the positive electrode is deteriorated by an increase in the positive electrode potential during the charging process.

Next, the battery B of Example 1 and the battery F of Example 2 were applied with a voltage of 3 V at 60° C. for consecutive 30 days, and then discharged with a load resistor of 3 kΩ until the terminal voltage dropped to 1 V. The maintenance rates of the electric capacities after the discharge compared to the initial capacities are shown in Table 2.

TABLE 2

| Battery | Capacity maintenance rate (%) after overcharge at 3 V at 60° C. for 30 days |
|---|---|
| B | 95 |
| F | 99 |

As clearly shown in Table 2, the battery B holds an electric capacity maintenance rate of 95% whereas the battery F holds an electric capacity maintenance rate of 99%, and it is found that the latter has been improved in stability against the overcharge. It is believed that the reason for this improvement may be that the active material lithium ion could be kept stable in the presence of graphite which shows electrochemical reversibility.

Subsequently, the batteries G, H and I of Example 3 and the battery B of Example 1 were applied with a voltage of 2.8 V at 80° C. for consecutive 10 days, and then discharged with a load resistor of 3 kΩ until the terminal voltage dropped to 1 V. The maintenance rates of the electric capacities after the discharge compared to the initial capacities are shown in Table 3.

TABLE 3

| Battery | Capacity maintenance rate: (%) after overcharge at 2.8 V at 80° C. for 10 days |
|---|---|
| B | 85 |
| G | 99 |
| H | 65 |
| I | 70 |

As clearly shown in Table 3, the battery G which comprises $LiN(CF_3SO_2)_2$ holds the electric capacity maintenance rate of about 90% whereas the electric capacity maintenance rates of the batteries B, H and I which comprise $LiPF_6$, $LiClO_4$ and $LiBF_4$, respectively are considerably decreased. It is believed that the reason for the decrease is due to possible decomposition of the electrolyte during the charging process at a temperature as high as 80° C. which adversely influences the battery performance. In addition, as a result of a similar test conducted on a battery which uses $LiN(C_2F_5SO_2)_2$ as a solute for the electrolyte, it is found that a substantially equal result to that of the battery G which uses $LiN(CF_3SO_2)_2$ as a solute for the electrolyte was obtained.

In the foregoing specific examples, although $Li_{4/3}Ti_{5/3}O_4$ was used as a main ingredient for the negative electrode, a similar advantage will be obtained with any of the previously described other spinel-type lithium-titanium oxides. In addition, although a natural graphite was added to the negative electrode in Example 2, an artificial graphite, an expanded graphite, a hardly graphitizable carbon, and any oxides or compounds, which have a lower potential than the spinel-type lithium-titanium oxides in the charged state and show reversibility in charge/discharge, can effectively be applied to the present invention as an additive to the negative electrode. Moreover, in the case of adding graphite, although the total negative electrode capacity of $Li_{4/3}Ti_{5/3}O_4$ and that of graphite is set to smaller than the positive electrode capacity, no problem would result by setting the electric capacity of only $Li_{4/3}Ti_{5/3}O_4$ to smaller than the positive electrode capacity as in the case of Example 1.

Further, although a lithium-containing manganese composite oxide was used as the positive electrode, there are several cases wherein the oxide has a plurality of plateaux of the discharge voltages and includes some plateaux which lack reversibility in the charge/discharge process. For instance, crystal vanadium pentoxide or the like has discharge plateaux in three steps or more, and if it is discharged until the terminal voltage drops to about 2 V, it substantially loses its reversibility. In such a case, it is preferable to cut off the discharge of the negative electrode at around 2.5 V or around 3 V, by limiting the electric capacity of the negative electrode. As such, in a positive electrode which can maintain its potential in the reversible region, it is possible to use any positive electrode active material.

As described previously, in a battery comprising a negative electrode of spinel-type lithium-titanium oxide, the present invention can greatly improve the withstanding overdischarge and overcharge characteristics at an ambient temperature as high as 60 to 80° C., not to mention simple charge/discharge performance, and thus its industrial value is very great.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A non-aqueous electrolyte lithium secondary battery comprising
   a negative electrode which comprises at least one lithium-titanium oxide having a spinel structure,
   a positive electrode which has a higher potential than that of said lithium-titanium oxide, and
   a non-aqueous electrolyte,
   wherein the ratio of a rechargeable electric capacity of said negative electrode to that of said positive electrode is not more than 1 and not less than 0.8, and wherein said negative electrode further comprises at least one material selected from the group consisting of $WO_2$, $Fe_2O_2$, $LiFe_5O_8$, $SiO_2$ and $SnO$.

2. The non-aqueous electrolyte lithium secondary battery in accordance with claim 1, wherein said non-aqueous electrolyte comprises ethylene carbonate as a solvent.

3. The non-aqueous electrolyte lithium secondary battery in accordance with claim 1, wherein said non-aqueous electrolyte comprises $LiN(CF_3SO_2)_2$ or $LiN(C_2F_5SO_2)_2$ as a solute.

4. The non-aqueous electrolyte lithium secondary battery in accordance with claim 1, wherein said non-aqueous electrolyte comprises ethylene carbonate as a solvent and $LiN(CF_3SO_2)_2$ as a solute.

5. The non-aqueous electrolyte lithium secondary battery in accordance with claim 1, wherein said lithium-titanium oxide is $Li_{4/3}Ti_{5/3}O_4$.

* * * * *